United States Patent [19]

Takatoh et al.

[11] Patent Number: 5,321,534
[45] Date of Patent: Jun. 14, 1994

[54] LIQUID CRYSTAL DISPLAY ELEMENT INCLUDING A GEL OF LIQUID CRYSTAL MATERIAL AND AN ORGANIC COMPOUND HAVING A PERFLUOROALKYL GROUP

[75] Inventors: Kohki Takatoh, Yokohama; Masanori Sakamoto, Kawasaki, both of Japan

[73] Assignee: Kabushiki Kaisha Toshiba, Kawasaki, Japan

[21] Appl. No.: 12,731

[22] Filed: Feb. 3, 1993

[30] Foreign Application Priority Data

Feb. 3, 1992 [JP] Japan .................................. 4-017490

[51] Int. Cl.⁵ ............................................. G02F 1/13
[52] U.S. Cl. ....................................... 359/52; 359/51; 359/103; 359/106
[58] Field of Search ..................... 359/51, 52, 106, 103

[56] References Cited

U.S. PATENT DOCUMENTS 5,177,629 1/1993 Bohannon .............................. 359/74

FOREIGN PATENT DOCUMENTS

| | | | |
|---|---|---|---|
| 0451905 | 10/1991 | European Pat. Off. | 359/51 |
| 3544292 | 7/1986 | Fed. Rep. of Germany . | |
| 4104183 | 7/1992 | Fed. Rep. of Germany | 359/103 |
| 58-501631 | 9/1983 | Japan . | |
| 61-502128 | 9/1986 | Japan . | |
| 4-014015 | 1/1992 | Japan | 359/103 |

OTHER PUBLICATIONS

Doane et al., "Current Trends in Polymer Dispersed Liquid Crystals", 1991 IEEE, pp. 175–178.
Hikmet, "Electrically induced light scattering from anisotropic gels", J. Appl. Phys., vol. 68, No. 9, (Nov. 1990) pp. 4406–4412.

*Primary Examiner*—Anita P. Gross
*Attorney, Agent, or Firm*—Oblon, Spivak, McClelland, Maier & Neustadt

[57] ABSTRACT

A liquid crystal display element comprises a pair of substrates having electrodes formed thereon, and a liquid crystal layer interposed between the substrates. The liquid crystal layer contains a gel of a mixture comprising an organic compound having a perfluoroalkyl group and a liquid crystal material.

13 Claims, 3 Drawing Sheets

LIQUID CRYSTAL DISPLAY ELEMENT INCLUDING A GEL OF LIQUID CRYSTAL MATERIAL AND AN ORGANIC COMPOUND HAVING A PERFLUOROALKYL GROUP

BACKGROUND OF THE INVENTION

1. Field of the Invention

The present invention relates to a liquid crystal display element.

2. Description of the Related Art

Known are liquid crystal display elements of a twisted nematic (TN) type or a supertwisted nematic (STN) type using nematic liquid crystals. A liquid crystal display element using a ferroelectric liquid crystal is also being proposed. In manufacturing a display element using these liquid crystals, however, it is necessary to apply, for example, an orientation treatment, making it difficult to manufacture a large display element.

Also known is a method of manufacturing a large liquid crystal display element at a low cost without requiring an orientation treatment. For example, a technique of forming a liquid crystal layer by dispersing encapsulated liquid crystal droplets in a polyvinyl alcohol is disclosed in PCT National Publication No. 58-501632 and U.S. Pat. No. 4,435,047. In a display element of this type, the liquid crystal molecules, if they exhibit a positive dielectric anisotropy within a thin film, are oriented in the direction of the electric field in the presence of an electric field. In this case, the liquid crystal layer becomes transparent, if the refractive index $n_o$ of the liquid crystal is equal to the refractive index $n_p$ of the polymer. If the electric field is removed, however, the liquid crystal molecules are brought back to the random arrangement. In this case, the refractive index of the liquid crystal droplet is deviated from $n_o$, with the result that light is scattered at the boundary region of the liquid crystal droplet and, thus, the liquid crystal layer is turned cloudy.

Additional techniques are known to the art for dispersing a liquid crystal material in a polymer. For example, a technique of dispersing a liquid crystal material in an epoxy resin is disclosed in PCT National Publication No. 61-502128. Also, a technique of dispersing a liquid crystal material in an urethane acrylate resin is disclosed in Published Unexamined Japanese Patent Application No. 2-83534. Further, a liquid crystal display element which permits improving the contrast is disclosed in Published Unexamined Japanese Patent Application No. 63-98631. Specifically, it is taught that an encapsulated liquid crystal portion is provided with a parallel light supply portion and a selective light transmitting portion for improving the contrast.

These polymer dispersed liquid crystal (PDLC) devices are advantageous in that:

1. A bright picture image can be formed because a polarizing plate is not required in the PDLC device;

2. A broad angle of visibility can be obtained in the PDLC device;

3. Since an orientation treatment is not required in manufacturing the PDLC device, it is possible to avoid problems accompanying the rubbing step such as dust generation and generation of electrostatic charges; and 4. The PDLC device is simpler in construction than the conventional liquid crystal display element prepared by sealing a liquid crystal material between a pair of substrates, making it possible to manufacture a large PDLC device without difficulty.

However, several defects are inherent in the conventional PDLC device, as described below:

1. Defect in the Manufacturing Process

In manufacturing a PDLC device, a thermosetting or photo-setting fluid resin having a liquid crystal material dispersed or dissolved therein is poured into a cell formed by using a pair of substrates provided with electrodes. Then, the fluid resin is cured by heating or by light irradiation so as to form a liquid crystal layer having liquid crystal droplets dispersed in a solid polymer matrix.

(i) In the manufacturing method outlined above, the liquid crystal droplets are made nonuniform in size or shape by a slight difference in the condition for the heating or light irradiation step, leading to nonuniform operating voltage and contrast of the manufactured display element. In the conventional method, however, it is difficult to control the heating or light irradiation step, though this step is very important as pointed out above.

(ii) In the conventional method, it is impossible to correct defects because the resin is cured, though in, for example, a TN or STN type liquid crystal display element, an orientation defect or the like can be corrected after manufacture of the element by an annealing treatment.

(iii) It is difficult to inject a liquid crystalcontaining resin into the cell at an elevated temperature, since the liquid crystal material tends to be separated from the resin in this injection step. It is substantially impossible to mix again uniformly the liquid crystal material with the resin.

(iv) Even if a dichroic dye is used in an attempt to improve the contrast, it is impossible to achieve the object because the dichroic dye is isotropically dispersed within the polymer matrix.

2. Brittleness against Mechanical Impact

Since a brittle resin is used for manufacturing a PDLC device in many cases, the device tends to be cracked upon receipt of a weak impact. It is substantially impossible to repair the cracks.

3. Electro-optical Defects (i) The light scattering in the absence of an electric field is insufficient, resulting in failure to obtain a high contrast, especially in a direct view type application.

(ii) During operation of the PDLC device, the refractive index of the liquid crystal material must be equal to that of the resin, with the result that the selection of the liquid crystal material and the resin is much restricted.

(iii) A hysteresis loop is formed when voltage is applied to the PDLC device, making it impossible to achieve a half tone display.

(iv) The conventional PDLC device requires a high driving voltage.

SUMMARY OF THE INVENTION

An object of the present invention is to provide a liquid crystal display element which permits forming a bright picture image without using a polarizing plate, permits a broad angle of visibility, and also permits eliminating an orientation treatment, while overcoming the defects inherent in the conventional polymer dispersed liquid crystal display element.

According to the present invention, there is provided a liquid crystal display element, comprising a pair of substrates having electrodes formed thereon, and a liquid crystal layer interposed between the substrates, said liquid crystal layer being formed of a gel containing a liquid crystal material.

In the present invention, an organic compound having a perfluoroalkyl group is used for preparing a gel containing a liquid crystal material. The liquid crystal layer included in the display element of the present invention may be formed of a gel alone of a mixture consisting of an organic compound having a perfluoroalkyl group and a liquid crystal material. Alternatively, the gel noted above may be dispersed in a polymer matrix to form the liquid crystal layer.

Additional objects and advantages of the invention will be set forth in the description which follows, and in part will be obvious from the description, or may be learned by practice of the invention. The objects an advantages of the invention may be realized and obtained by means of the instrumentalities and combinations particularly pointed out in the appended claims.

DETAILED DESCRIPTION OF THE PREFERRED EMBODIMENTS

Figure 1A:
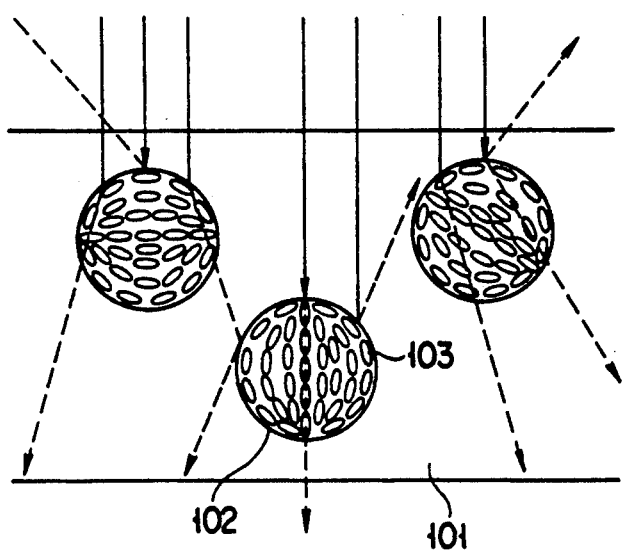
FIGS. 1A and 1B schematically show the states of light transmission and scattering in a conventional polymer dispersed liquid crystal cell, FIG. 1A showing the state in the absence of an electric field, and FIG. 1B showing the state in the presence of an electric field.

In the present invention, an organic compound having a perfluoroalkyl group is used for preparing a gel constituting the liquid crystal layer of the cell. The organic compound used in the present invention consists of a perfluoroalkyl group and an organic residue. The perfluoroalkyl group is not particularly restricted as far as the group has at least two carbon atoms. On the other hand, the organic residue includes, for example, an alkyl group, an aromatic ring structure such as a benzene ring, a naphthalene ring and a biphenyl ring, and a hetero ring structure such as a pyridine ring and a piperidine ring.

The compounds represented by the general formulas given below can be used in the present invention as an organic compound having a perfluoroalkyl group:

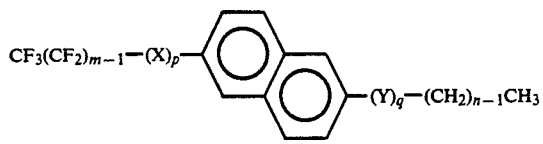

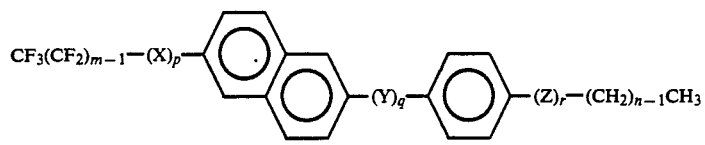

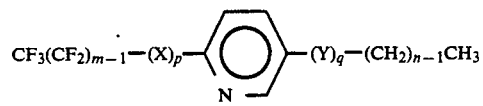

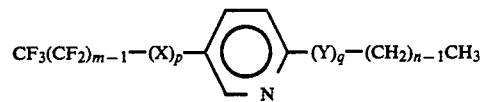

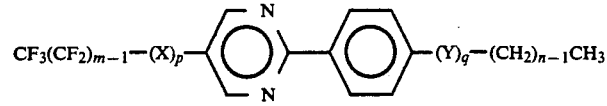

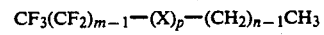

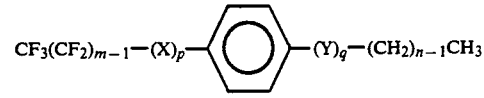

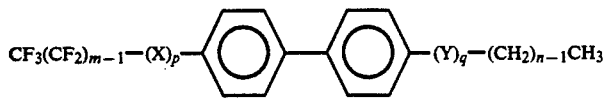

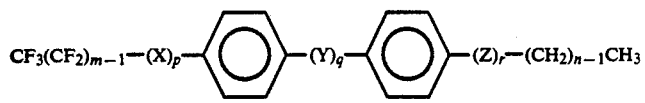

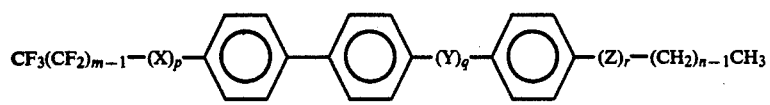

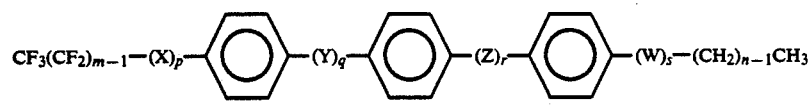

In any of the general formulas given above, each of m and n denotes integers of 3 to 30, each of p, g, r and s is 0 or 1, and each of X, Y, Z and W denotes a chemical bond selected from the group consisting of —C(-C=O)—O—, —O—C(C=O)—O—, =CH=N— and —N=CH—. These organic compounds may be used singly or in combination.

The liquid crystal material is not particularly restricted in the present invention, as far as the material is in the form of liquid crystal at room temperature. However, a nematic liquid crystal is particularly adapted for achieving the object of the present invention.

In the present invention, it is possible for the liquid crystal layer to contain a dichroic dye serving to improve the contrast of the display element. In this case, since the dichroic dye is not isotropically dispersed within the liquid crystal layer, the contrast is efficiently improved.

The organic compound having a perfluoroalkyl group is preferably added in an amount of 0.01 to 90% by weight, more preferably 0.1 to 50% by weight, based on the amount of the liquid crystal material. Where the amount of the particular organic compound is unduly small, the opaqueness (light shielding property) of the display is lowered in the absence of an electric field, leading to a low contrast, though the transparency of the display is improved in the presence of an electric field. On the other hand, where the amount of the particular organic compound is unduly large, the opaqueness of the display is certainly increased in the absence of an electric field. However, the transparency of the display screen is lowered in the presence of an electric field, also leading to a low contrast.

The dichroic dye, when used, is preferably added in an amount of 0.01 to 10% by weight, more preferably 0.1 to 5% by weight, of the liquid crystal material. Where the amount of the dichroic dye is unduly small, it is impossible to improve the contrast sufficiently. On the other hand, where the amount of the dichroic dye is unduly large, the coloring problems remains even in the presence of an electric field, also leading to a low contrast.

In the present invention, it is also possible to prepare the liquid crystal layer by dispersing droplets of a gel of a mixture consisting of an organic compound having a perfluoroalkyl group and a liquid crystal material into a polymer matrix. Any of thermoplastic resin, thermosetting resin and photo-setting resin can be used in the present invention as a polymer matrix. In the case of using a thermosetting resin, a curing agent and a curing accelerator are used together. In the case of using a photo-setting resin, a photo-curing agent and a curing accelerator are used together.

It is desirable to us the gel-forming material in an amount of 10 to 95% by weight based on the amount of the thermosetting resin or photo-setting resin used as a polymer matrix.

The display element of the present invention is manufactured as follows. Specifically, used as a substrate is a glass substrate having a pattern of indium tin oxide (ITO) formed thereon, a substrate having thin film transistors (TFT) formed thereon or a color filter having an ITO pattern formed thereon. The distance between the two mutually facing substrates, i.e., the cell gap, preferably falls within a range of between 1 and 100 microns, more preferably between 5 and 50 microns. Where the cell gap is unduly small, it is impossible to obtain a sufficient contrast. Where the cell gap is unduly large, however, a high driving voltage is required.

The gel containing a liquid crystal material may be prepared immediately before injection into the cell or may be prepared in advance. In view of the efficiency of manufacturing the display element, it is desirable to prepare the gel in advance. Where the gel prepared in advance is preserved over a long period of time, the gel should be heated to prepare a uniform isotropic liquid. The resultant liquid material containing a liquid crystal material should be stirred before injection into the cell gap. Where it is impossible to employ the particular method, it may be used a method of placing a gel mixture in the cell, heating the cell to form an isotropic liquid, and then gradually cooling the cell to form a gel. In the display element of the present invention, the liquid crystal material and the organic compound having a perfluoroalkyl group are not separated from each other within the liquid crystal layer. After the injection, the injection port is sealed with a thermosetting or photo-setting resin.

In the case of preparing a liquid crystal layer, in which droplets of a gel of a mixture consisting of an organic compound having a perfluoroalkyl group and a liquid crystal material are dispersed in a polymer matrix consisting of a thermosetting resin or a photosetting resin, a mixture of the required materials is injected into a cell gap, followed by curing the resin by heating or irradiation with light.

In the present invention, a polarizing plate need not be used as in the conventional polymer dispersion type liquid crystal display element. The present invention also produces a prominent merit that the orientation treatment by rubbing need not be employed.

As described above, the liquid crystal display element of the present invention can be manufactured quite easily and the nonuniformity in the characteristics of the display element, which may be derived from the conditions in the manufacturing process, can be markedly diminished, compared with the conventional liquid crystal display element.

The liquid crystal display element of the present invention exhibits prominent features in terms of the element characteristics as follows:

1. It is possible to suppress occurrence of a hysteresis loop during display of a picture image, because a model of the gradual deformation of the liquid crystal within the liquid crystal layer, which is a main cause of the hyteresis loop generation, is not effected in the display element of the present invention.

2. Such a high contrast as 1 : 50 to 1 : 80, which is fully comparable with that in a TN type liquid crystal cell, can be achieved in the display element of the present invention.

3. The value of $V_{th}$ is as low as 2 to 4 V, making it possible to drive the display element of the present invention with a low voltage fully comparable with that in a TN type liquid crystal cell.

4. Since a polarizing plate is not required in the liquid crystal display element of the present invention, the light transmittance in the presence of an electric field is as high as 80 to 90%, leading to a highly bright display.

Figure 1B:
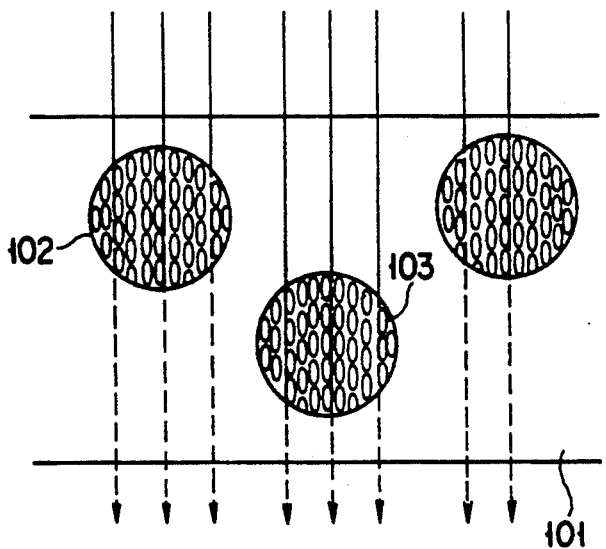
Figure 2A:
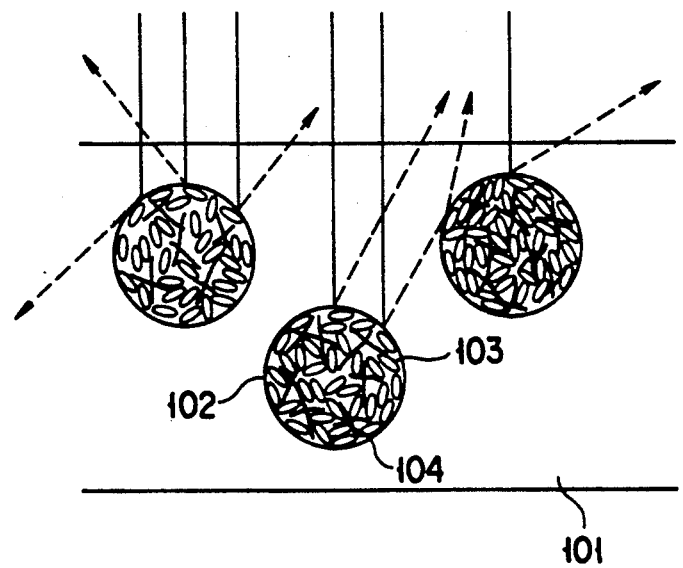
FIGS. 2A and 2B schematically show the states of light transmission and scattering in a liquid crystal cell of the present invention, FIG. 2A showing the state in the absence of an electric field, and FIG. 2B showing the state in the presence of an electric field.
Figure 2B:
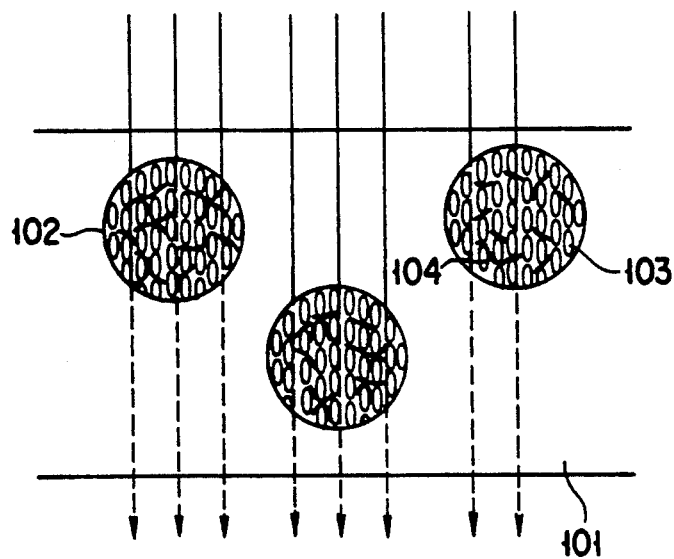

FIGS. 1 and 2 are intended to show the difference in contrast between the liquid crystal display element of the present invention and the conventional liquid crystal display element. Specifically, FIG. 1 schematically shows the states of light transmission and scattering in a conventional polymer dispersed liquid crystal cell, with FIG. 2 schematically showing the states of light transmission and scattering in a liquid crystal cell of the present invention. For making the comparison simple, a polymer dispersed liquid crystal cell is shown in FIG. 2 as a cell of the present invention. Of course, the situation described below also applies to a cell of the present invention in which the liquid crystal layer is formed of a gel alone of a mixture consisting of a liquid crystal material and an organic compound having a perfluoroalkyl group. In any of the conventional cell and the cell of the present invention, liquid crystal molecules 103 within a liquid crystal droplet 102 are present at random in the absence of an electric field, with the result the light is scattered within the cell, as shown in FIGS. 1A and 2A. During voltage application, however, the liquid crystal molecules 103 within the liquid crystal droplets 102 dispersed in a polymer matrix 101 are aligned in the direction of the electric field, with the result that light runs through the cell, as shown in FIGS. 1B and 2B. What should be noted is that, in the cell of the present invention, the degree of freedom of the liquid crystal molecules 103 is regulated by an organic compound 104 having a perfluoroalkyl group, with the result that the degree of random arrangement of the liquid crystal molecules is enhanced in the absence of an electric field, compared with the liquid crystal molecules used in the conventional cell. It follows that the light scattering is promoted in the cell of the present invention, leading to an improved light shielding effect in the absence of an electric field and, thus, to an improved contrast compared with the conventional cell.

EXAMPLES

Figure 3A:
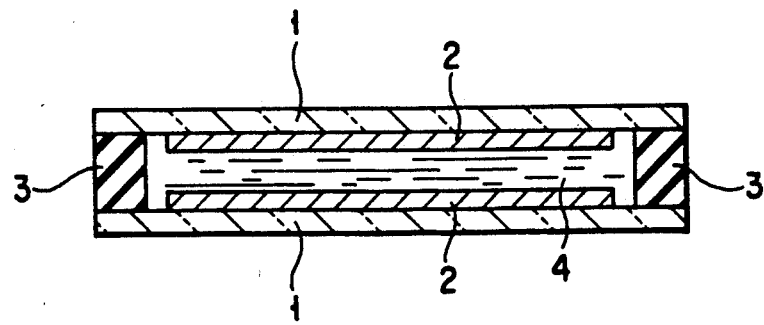
FIGS. 3A and 3B are a cross sectional view and a plan view, respectively, showing a liquid crystal display element according to one embodiment of the present invention.

Let us describe some Examples of the present invention with reference to the accompanying drawings. In each of the following Examples, manufactured was a liquid crystal cell constructed as shown in FIGS. 3A (cross sectional view) and 3B (plan view). To be more specific, an ITO transparent electrode 2 was formed on the surface of each of two glass substrates 1. These two glass substrates 1 were disposed to permit the ITO transparent electrodes 2 to face each other, and bonded to each other at the peripheral region with an adhesive layer 3 interposed therebetween. Further, a liquid crystal layer 4 was formed between the two glass substrates 1. The liquid crystal display element was sized at 3 cm×2 cm, with the cell gap being determined appropriately.

EXAMPLE 1

A liquid crystal display element according to one embodiment of the present invention was manufactured as follows, using 10 g of ZLI-1132 (trade name of a nematic liquid crystal manufactured by Merk) and 500 mg of 1H,1H,1H,1H-perfluorooctyl 4'-n-octyloxy-4-biphenylcarboxylate as raw materials of a liquid crystal layer.

In the first step, the raw materials of the liquid crystal layer were heated to 100° C. within a glass sample bottle, and kept stirred until formation of a transparent uniform mixture. The resultant mixture was cooled to room temperature to obtain a white gel-like material. The mixture was heated again to 100° C. to obtain an isotropic liquid material. On the other hand, a liquid crystal cell having a cell gap of 10 microns was heated to 100° C. on a hot plate disposed under vacuum. The heated isotropic liquid material was injected into the cell thus heated, followed by gradually cooling the cell to room temperature.

The liquid crystal cell thus manufactured was found to exhibit a threshold voltage $V_{th}$ (90%) of 4.2 V, a contrast of 1 : 30, and a light transmittance of 80%. Further, a hyteresis loop was not recognized.

EXAMPLE 2

A liquid crystal display element was manufactured as in Example 1, except that the cell gap was set at 30 microns. The display element thus manufactured was found to exhibit a threshold voltage $V_{th}$ (90%) of 12 V, a contrast of 1 : 65, and a light transmittance of 60%. Further, a hyteresis loop was not recognized.

EXAMPLE 3

A liquid crystal display element was manufactured as in Example 1, except that n-octyl 4'-perfluoroctyloxy-4-biphenylcarboxylate was used as an organic compound having a perfluoroalkyl group. The display element thus manufactured was found to exhibit a threshold voltage $V_{th}$ (90%) of 4 V, a contrast of 1 : 30, and a light transmittance of 80%. Further, a hyteresis loop was not recognized.

EXAMPLE 4

A liquid crystal display element was manufactured as in Example 1, except that n-octyl 4'-perfluoroctyloxy-4- phenylcarboxylate was used as an organic compound having a perfluoroalkyl group. The display element thus manufactured was found to exhibit a threshold voltage Vth (90%) of 4.3 V, a contrast of 1 : 30, and a light transmittance of 83%. Further, a hyteresis loop was not recognized.

COMPARATIVE EXAMPLE

A conventional polymer dispersion type liquid crystal display element was manufactured as follows, using 10 g of ZLI-1132 (trade name of a nematic liquid crystal manufactured by Merk), 1.5 g of Epikote 828 (trade name of an epoxy resin manufactured by Yuka Shell) and 10 mg of triethylenetetramine (TTA) as raw materials of a liquid crystal layer.

Figure 3B:
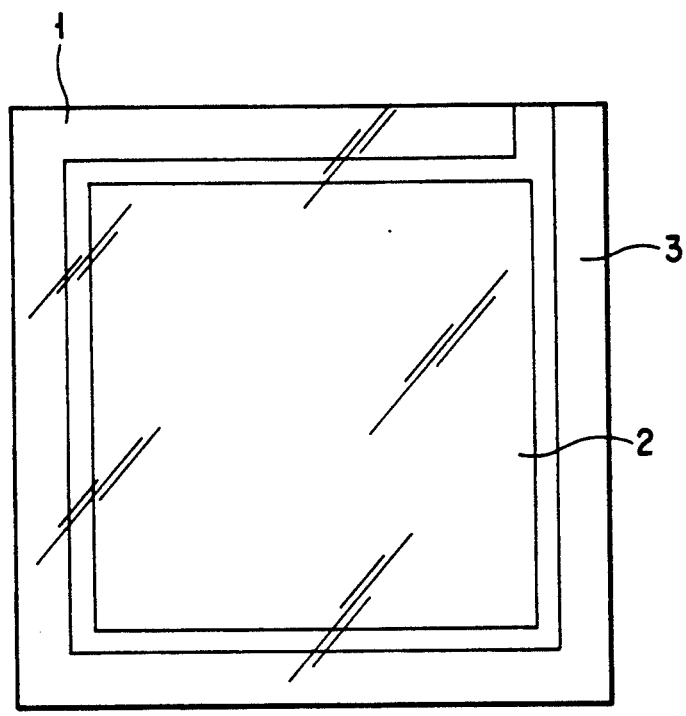

In the first step, a mixture of these raw materials was injected into a cell constructed as shown in FIG. 3. However, the liquid crystal and the epoxy resin were separated from each other within the cell, making it impossible to use the cell. Thus, a simple cell was manufactured by spraying spherical spacers having a diameter of 10 microns onto the lower substrate, followed by dripping the mixture noted above onto the lower substrate and, then, mounting the upper substrate. The resultant cell was heated at 160° C. for one hour so as to cure the epoxy resin, thereby manufacturing a polymer dispersed liquid crystal cell. The display element thus manufactured was found to exhibit a threshold voltage Vth (90%) of 15 V, a contrast of 1 : 7.5, and a light transmittance of 70%. Further, a hyteresis loop was recognized.

EXAMPLE 5

A liquid crystal display element according to another embodiment of the present invention was manufactured as follows, using 10 g of ZLI-1132 (trade name of a nematic liquid crystal manufactured by Merk), 1.5 g of Epikote 828 (trade name of an epoxy resin manufactured by Yuka Shell), 10 mg of triethylenetetramine (TTA) and 500 mg of 1H,1H,1H,1H-perfluoroctyl 4'-n-octyloxy-4-biphenylcarboxylate as raw materials of a liquid crystal layer.

In the first step, the raw materials of the liquid crystal layer were heated to 100° C. within a glass sample bottle, and kept stirred until formation of a transparent uniform mixture. The resultant mixture was cooled to room temperature to obtain a white gel-like material. On the other hand, spherical spacers having a diameter of 10 microns were sprayed onto the lower substrate, followed by dripping the gel-like mixture onto the lower substrate and, then, mounting the upper substrate so as to manufacture a simple cell. The resultant cell was heated at 160° C. for one hour so as to cure the epoxy resin, thereby manufacturing a liquid crystal cell. The display element thus manufactured was found to exhibit a threshold voltage $V_{th}$ (90%) of 15.5 V, a contrast of 1 : 45, and a light transmittance of 70%. Further, a hyteresis loop was not recognized.

EXAMPLE 6

A composition of a liquid crystal layer was prepared as in Example 5, except that 1.5 g of butyl acrylate and Irgacure 651 (trade name of a photosensitive agent manufactured by Ciba-Geigy) were used as a photosensitive monomer and a photosensitive agent, respectively, in place of 1.5 g of the epoxy resin and 10 mg of triethylenetetramine used in Example 5.

A simple cell was manufactured exactly as in Example 5 by spraying spherical spacers having a diameter of 10 microns onto the lower substrate, followed by dripping the gel-like mixture onto the lower substrate and, then, mounting the upper substrate. The resultant cell was irradiated with light emitted from a mercury lamp of 80 W/cm so as to cure the photosensitive monomer of butyl acrylate, thereby manufacturing a liquid crystal cell. The display element thus manufactured was found to exhibit a threshold voltage $V_{th}$ (90%) of 15 V, a contrast of 1 : 40, and a light transmittance of 70%. Further, a hyteresis loop was not recognized.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display element, comprising a pair of substrates having electrodes formed thereon, and a liquid crystal layer interposed between the substrates, said liquid crystal layer being formed of a gel comprising a mixture of a liquid crystal material and an organic compound having a perfluoroalkyl group.

2. The display element according to claim 1, wherein said liquid crystal material is a nematic liquid crystal.

3. The display element according to claim 1, wherein said organic compound having a perfluoroalkyl group consists of a perfluoroalkyl group having at least two carbon atoms and at least one organic residue selected from the group consisting of an alkyl group, an aromatic ring and a hetero ring.

4. The display element according to claim 1, wherein said organic compound having a perfluoroalkyl group is contained in an amount of 0.01 to 90% by weight of the amount of the liquid crystal material and the organic compound having a perfluoroalkyl group.

5. The display element according to claim 4, wherein said organic compound having a perfluoroalkyl group is contained in an amount of 0.1 to 50% by weight of the amount of the liquid crystal material and the organic compound having a perfluoroalkyl group.

6. The display element according to claim 1, wherein said liquid crystal layer further contains a dichroic dye.

7. The display element according to claim 6, wherein said dichroic dye is contained in an amount of 0.01 to 10% by weight of the amount of the liquid crystal material and the dichroic dye.

8. The display element according to claim 7, wherein said dichroic dye is contained in an amount of 0.1 to 5% by weight of the amount of the liquid crystal material and the dichroic dye.

9. A liquid crystal display element, comprising a pair of substrates having electrodes formed thereon, and a liquid crystal layer interposed between the substrates, said liquid layer being formed of a polymer matrix and a gel comprising a mixture of a liquid crystal material and an organic compound having a perfluoroalkyl group, said gel being dispersed in said polymer matrix.

10. The display element according to claim 9, wherein said polymer matrix is formed of a thermosetting resin.

11. The display element according to claim 10, wherein the amount of said gel falls within a range of between 10 and 95% by weight of the amount of said thermosetting resin used as a polymer matrix and said gel.

12. The display element according to claim 9, wherein said polymer matrix is formed of a photo-setting resin.

13. The display element according to claim 12, wherein the amount of said gel falls within a range of between 10 and 95% by weight of the amount of said photo-setting resin used as a polymer matrix and said gel.

* * * * *